H. J. WILLEMS.
POULTRY FOUNTAIN.
APPLICATION FILED MAY 22, 1918.

1,314,033.

Patented Aug. 26, 1919.

WITNESSES
G. Stadler
Emil Straka

INVENTOR
H. J. Willems
By H. J. Sanders
ATTY.

UNITED STATES PATENT OFFICE.

HENRY J. WILLEMS, OF KENOSHA, WISCONSIN.

POULTRY-FOUNTAIN.

1,314,033.  Specification of Letters Patent.  Patented Aug. 26, 1919.

Application filed May 22, 1918. Serial No. 235,955.

*To all whom it may concern:*

Be it known that I, HENRY J. WILLEMS, a citizen of the United States, residing at Kenosha, in the county of Kenosha and State of Wisconsin, have invented certain new and useful Improvements in Poultry-Fountains, of which the following is a specification.

This invention relates to improvements in watering tanks for animals that supply the water automatically to the trough. One object of the invention is to provide a trough of this type which is open in the front and which can be tipped upon one end to permit filling and to determine the quantity of water contained, it being important to know whether the tank has sufficient water to last the animals depending upon it until the next regular time for filling. A further object is to provide a tank of very simple construction, efficient in use and cheap to manufacture.

With the foregoing and other objects in view the invention consists in the combination and arrangement of parts to be hereinafter fully described, pointed out in the appended claims and illustrated in the accompanying drawing which forms a part of this specification and in which—

Like reference characters denote corresponding parts throughout the several views.

Figure 2:
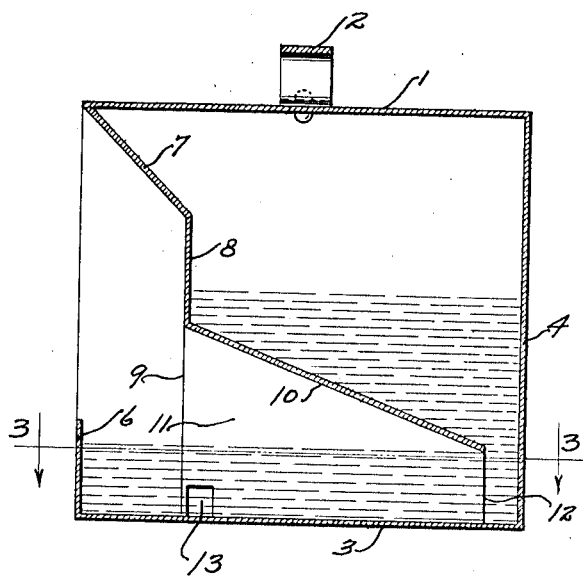
Fig. 2 is a longitudinal sectional view taken on line 2—2 of Fig. 1.
Figure 1:
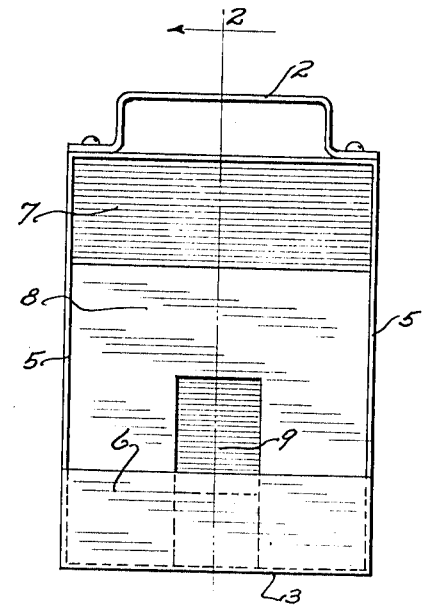
Figure 1 is a view of the device in front elevation.
Figure 3:
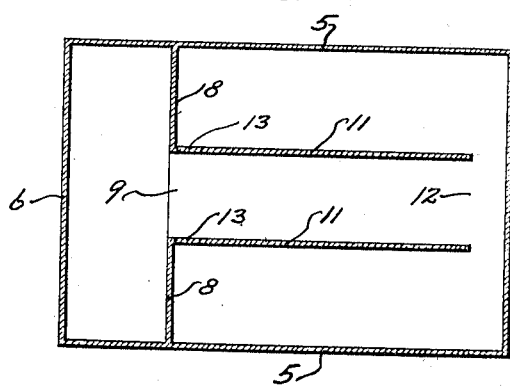
Fig. 3 is a cross section taken on line 3—3 of Fig. 2.

My improved poultry fountain comprises a tank having the top 1, to which the handle 2 is secured, the base 3, rear end 4 and the sides 5. The base 3 is formed with the upturned front edge 6 and the tank is formed with a partition including the inwardly and oblique downwardly extending wall 7, which starts at the tank top 1, which merges into the vertical wall 8 in which an opening 9 is formed having the downwardly sloping top wall 10 and the parallel downwardly sloping side walls 11, a contracted opening 12 being formed in the inner end of the sloping extension or structure just described, said opening 12 being spaced away from the rear tank wall 4 and the sloping side walls 11 being spaced a considerable distance away from the sides 5 of the tank as clearly shown in Fig. 3. The said side walls 11 are formed with the air holes 13. The space between the walls 8 and 6 forms a drinking trough for the animals and the space between the walls 7, 8, 10, 11 and 1, 4, 5 forms a reservoir, the inner end of the wall 10 being in the plane of the normal water level or drinking level and below the plane of the upturned end of the base 3.

Figure 4:
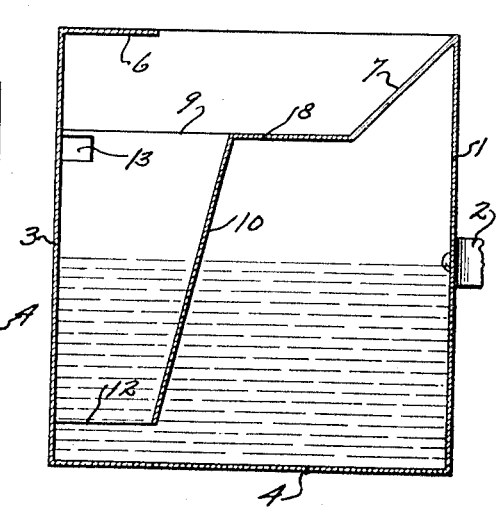
Fig. 4 is a view of Fig. 2 turned upon its rear end.

When the tank is empty I fill it by standing it upon its rear wall 4 as shown in Fig. 4 and pouring water into the opening 9 in the partition 8, this water filling the reservoir through the opening 12, the air in the reservoir being partly evacuated through the openings 13 in the side walls 11. After the tank has been in use for a period it can readily be determined whether the same is in need of water by turning it upon its end 4 and noting the water level as illustrated in Fig. 4.

What is claimed is:—

1. In a stock watering device, a tank having a base formed with an upturned front end, a partition starting flush with the front end of the tank and extending inwardly and downwardly therefrom, said partition being formed with an extension sloping rearwardly and downwardly, the end thereof being disposed adjacent the rear wall of the tank, said extension end being disposed below the plane of the end of the upturned base portion, the side walls of said extension being spaced away from the sides of the tank and perforated, and a handle for the tank.

2. In a stock watering device, a tank having a base and a rear wall upon which member it is adapted to rest in operative position interchangeably, a front wall carried by said base, a partition starting flush with the front end of the tank and extending inwardly therefrom, said partition being formed with an extension sloping toward said rear wall and terminating in a perforated portion adjacent said wall, said extension end approaching nearer the base than the free termination of said front wall, and 5 a handle for said tank.

In testimony that I claim the foregoing as my own I have hereto affixed my signature in the presence of two subscribing witnesses.

HENRY J. WILLEMS.

Witnesses:
WILLIAM WILLEMS, Jr.,
FLOYD V. HAUSER.